(12) United States Patent
Florencio et al.

(10) Patent No.: US 7,681,234 B2
(45) Date of Patent: Mar. 16, 2010

(54) PREVENTING PHISHING ATTACKS

(75) Inventors: Dinei A. Florencio, Redmond, WA (US); Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 11/172,466

(22) Filed: Jun. 30, 2005

(65) Prior Publication Data

US 2007/0006305 A1 Jan. 4, 2007

(51) Int. Cl.
*G06F 12/14* (2006.01)
(52) U.S. Cl. .................................................. 726/22
(58) Field of Classification Search .................. None
See application file for complete search history.

(56) References Cited

U.S. PATENT DOCUMENTS

| | | | |
|---|---|---|---|
| 6,044,152 A | 3/2000 | Mendolia | |
| 6,104,916 A | 8/2000 | Steinhoff et al. | |
| 6,230,269 B1 | 5/2001 | Spies et al. | |
| 6,662,300 B1 | 12/2003 | Peters | |
| 6,754,507 B2 | 6/2004 | Takagi | |
| 6,845,380 B2 | 1/2005 | Su et al. | |
| 6,848,078 B1 | 1/2005 | Birsan et al. | |
| 6,925,313 B2 | 8/2005 | Kweon et al. | |
| 7,152,244 B2 * | 12/2006 | Toomey | 726/26 |
| 7,392,543 B2 * | 6/2008 | Szor | 726/23 |
| 7,475,135 B2 * | 1/2009 | Bantz et al. | 709/224 |
| 2003/0023876 A1 | 1/2003 | Bardsley et al. | |
| 2003/0025668 A1 | 2/2003 | Lin | |
| 2003/0163737 A1 | 8/2003 | Roskind | |
| 2003/0199289 A1 | 10/2003 | Kao et al. | |
| 2003/0204481 A1 | 10/2003 | Lau | |
| 2004/0060007 A1 | 3/2004 | Gottlob et al. | |
| 2004/0128296 A1 | 7/2004 | Krishnamurthy et al. | |
| 2004/0143581 A1 | 7/2004 | Bohannon et al. | |
| 2004/0158714 A1 | 8/2004 | Peyravian | |
| 2004/0261018 A1 | 12/2004 | Dunne et al. | |
| 2005/0022020 A1 | 1/2005 | Fremberg | |
| 2005/0041009 A1 | 2/2005 | Kuroda | |
| 2005/0049017 A1 | 3/2005 | Yoda | |
| 2005/0068913 A1 | 3/2005 | Tan et al. | |

(Continued)

FOREIGN PATENT DOCUMENTS

JP   14-073553 A   3/2002

(Continued)

OTHER PUBLICATIONS

International Search Report dated Oct. 24, 2007 for PCT Application Serial No. PCT/US2007/004044, 3 Pages.

(Continued)

*Primary Examiner*—Kambiz Zand
*Assistant Examiner*—Aubrey H Wyszynski
(74) *Attorney, Agent, or Firm*—Lee & Hayes, PLLC

(57) ABSTRACT

A system for protecting against information security breaches comprises a credential module that maintains a list of protected security credentials that are each associated with a known computing system and that detects when a security credential in the list is used. The system also includes a protection module that detects use of the security credential in connection with a computing system other than the known computing system with which the security credential is associated and that reports such use to a security server. Methods for using the system are also provided.

19 Claims, 12 Drawing Sheets

U.S. PATENT DOCUMENTS

| | | | |
|---|---|---|---|
| 2005/0087769 A1 | 4/2005 | Yamazaki et al. | |
| 2005/0108567 A1 | 5/2005 | D'Souza et al. | |
| 2005/0127820 A1 | 6/2005 | Yamazaki et al. | |
| 2005/0177578 A1 | 8/2005 | Chen | |
| 2005/0179850 A1 | 8/2005 | Du | |
| 2005/0182778 A1 | 8/2005 | Heuer et al. | |
| 2005/0192990 A1 | 9/2005 | Kharitidi et al. | |
| 2005/0229097 A1 | 10/2005 | Lander | |
| 2005/0235358 A1 | 10/2005 | Keohane et al. | |
| 2006/0055608 A1 | 3/2006 | Minemura | |
| 2006/0200856 A1* | 9/2006 | Salowey et al. | 726/5 |
| 2006/0216469 A1 | 9/2006 | Hashizume | |
| 2006/0232495 A1 | 10/2006 | Chang et al. | |
| 2006/0250312 A1 | 11/2006 | Kobayashi | |
| 2007/0005984 A1 | 1/2007 | Florencio et al. | |
| 2007/0006305 A1 | 1/2007 | Florencio et al. | |
| 2007/0199054 A1 | 8/2007 | Florencio et al. | |
| 2008/0015002 A1 | 1/2008 | Crisp | |

OTHER PUBLICATIONS

U.S. Appl. No. 11/360,900, filed Feb. 23, 2006, Florencio, et al.

U.S. Appl. No. 11/360,254, filed Feb. 23, 2006, Florencio, et al.

Adida, B. et al., "Fighting Phishing Attacks: A Lightweight Trust Architecture for Detecting Spoofed Emails," in Proceedings of DIMACS Workshop on Theft in E-Commerce: Content, Identity, and Service, Piscataway, New Jersey, Apr. 2005, 16 pages.

Adida, B. et al., "Separable Identity-based Ring Signatures: Theoretical Foundations for Fighting Phishing Attacks," in Proceedings of DIMACS Workshop on Theft in E-Commerce: Content, Identity, and Service, Piscataway, New Jersey, Feb. 28, 2005, 18 pages.

Chou, N. et al., "Client-Side Defense Against Web-Based Identity Theft," in Proceedings of 11th Annual Network and Distributed System Security Symposium (NDSS '04), San Diego, Feb. 2004, 16 pages.

Delany, M., "Domain-Based Email Authentication Using Public-Keys Advertised in the DNS (DomainKeys)," Internet Draft available at: http://www.ietf.org/internet-drafts/draft-delany-domainkeys-base-03.txt, Sep. 29, 2005, last checked Feb. 24, 2006, 40 pages.

Florencio, D. and Herley, C., "Stopping a Phishing Attack, Even When the Victims Ignore Warnings," Microsoft Research Technical Report, Oct. 2005. Available at: http://research.microsoft.com/research/pubs/view.aspx?type=Publication&id=1489, last accessed Feb. 24, 2006.

Gabber, E. et al., "How to Make Personalized Web Browsing Simple, Secure, and Anonymous," Financial Cryptography, 1997, pp. 17-32.

Halderman, J.A. et al., "A Convenient Method for Securely Managing Passwords," in Proceedings of the 14th International World Wide Web Conference (WWW 2005), Chiba, Japan, May 10-14, 2005, 9 pages.

Jakobsson, M. and Young, A., "Distributed Phishing Attacks," in Proceedings of DIMACS Workshop on Theft in E-Commerce: Content, Identity, and Service, Piscataway, New Jersey, Apr. 2005, 10 pages.

Kelsey, J. et al., "Secure Applications of Low-Entropy Keys," Lecture Notes in Computer Science, 1997, vol. 1396, pp. 121-134.

Oechslin, P., "Making a Faster Cryptanalytical Time-Memory Trade-Off," in Proceedings of Advances in Cryptology—Crypto 2003, 23rd Annual International Cryptology Conference, Santa Barbara, California, Aug. 17-21, 2003, 15 pages.

Sahami, M. et al., "A Bayesian Approach to Filtering Junk Email," in AAAI '98 Workshop on Learning for Text Categorization, Jul. 1998, 8 pages.

http://www.passport.com, links directly to: https://accountservices.passport.net/ppnetworkhome.srf?vv=330&lc=1033, last accessed Feb. 28, 2006.

http://www.spoofstick.com, last accessed Feb. 28, 2006.

Anti-Phishing Working Group, at http://www.antiphishing.org, last accessed Feb. 28, 2006.

"Bloom Filter" http://www.nist.gov/dads/HTML/bloomFilter.html last viewed, Mar. 14, 2006, 1 page.

"Earthlink Toolbar Featuring ScamBlocker for Windows Users" http://www/earthlink.net/software/free/toolbar/, last accessed Mar. 14, 2006, 2 pages.

Ross, et al. "Stronger Password Authentication Using Browser Extensions" (2005) Proceedings of the 14th Usenix Security Symposium 15 pages.

"James F. Power, et al., A metrics suite for grammar-based software, Journal of Software Maintenance and Evolution: Research and Practice, 2004. http://www.cs.nuim.ie/~jpower/Research/Papers/2004/jsme04.pdf".

Luc Segoufin, Typing and Querying XML Documents: Some Complexity Bounds. http://delivery.acm.org/10.1145/780000/773170/p167-segoufin.pdf?key1=773170&key2=7019847311&coll=GUIDE&dl=GUIDE&CFID=65860176&CFTOKEN=65663645.

Mustafa H. Qureshi, et al., Determining the Complexity of XML Documents. http://doi.ieeecomputersociety.org/10.1109/ITCC.2005.126.

Ralf Lammel, et al., Analysis of XML schema usage, http://homepages.cwi.nl/~ralf/xml05/html/paper.htm.

Ross, B. et al., "A Browser Plug-In Solution to the Unique Password Problem," in Proceedings of the 14th USENIX Security Symposium, Technical Report Stanford-SecLab-TR-2005-1, 2005, 15 pages.

Thomas J. McCabe, A complexity measure ; http://portal.acm.org/citation.cfm?id=807712&coll=GUIDE&dl=GUIDE&CFID=62736624&CFTOKEN=661444&ret=1#Fulltext.

Netcraft, "Netcraft Toolbar Help Pages FAQ," 2004, available at: http://toolbar.netcraft.com/help/faq/index.html.

Boneh, et al., "Defending Against Online Identity Theft and Phishing," presentation given at Proceedings: United States—Japan Critical Information Infrastructure Protection Workshop, Sep. 2004, available at: http://www2.gwu.edu/~usjpciip/BonehD.pdf.

Boneh, et al., "Web Password Hashing," 3 pages, last accessed Jun. 28, 2005, available at: http://crypto.stanford.edu/PwdHash/.

Ross, et al., "Stronger Password Authentication Using Browser Extensions," all pages, date of publication unknown, available at: http://crypto.stanford.edu/PwdHash/pwdhash.pdf.

OA Dated Dec. 23, 2008 for U.S. Appl. No. 11/318,378, 25 pages.

OA Dated Dec. 3, 2008 for U.S. Appl. No. 11/317,767, 13 pages.

OA Dated Oct. 15, 2008 for U.S. Appl. No. 11/318,209, 14 pages.

OA Dated Dec. 29, 2008 for U.S. Appl. No. 11/319,377, 19 pages.

* cited by examiner

PREVENTING PHISHING ATTACKS

BACKGROUND

As the Internet grows in popularity as a business medium, users engage in a wider variety of transactions online. Some of these transactions, such as transactions with financial institutions or online retailers, can involve sensitive personal information such as bank account numbers or credit card information. To protect such information, a variety of methods can be employed. For example, many online institutions require users to register with the institution and obtain a unique user name and password prior to transacting any business online.

One consequence of this system is that a username and password can only help protect the personal information of a user so long as the username and password remain under the control of the user. A third party who obtains the username and password of another can use that username and password to perform any transaction that the owner could perform. This consequence has spawned a practice commonly referred to as phishing.

Phishing can generally be described as an attempt by a third party to deceive a user into disclosing his username and password to that third party through the third party's impersonation of an entity that is known and trusted by the user. Generally, a phishing attack can be initiated by sending an electronic mail message to a user that is crafted to appear to originate from a known and trusted entity. Such electronic mail messages commonly inform the recipient that the entity must verify the information of the user by having the user enter his username and password. The user may enter this information at a web site that appears to belong to the known and trusted entity but is actually controlled by a third party. Once the user enters this information at the web site of the third party, sometimes called a phishing site, the third party can use the entered username and password at the real website of the entity that the third party is impersonating to perform transactions or even to wrest control of an account with the known and trusted party away from the user.

Several factors make phishing a challenging problem from a computer security standpoint. First, in phishing attacks the victim unknowingly or unwittingly assists the attacker by voluntarily providing his security credentials such as a username and password to the attacker. Second, identifying phishing sites can be difficult using a fixed algorithm because attackers both quickly adapt to security measures and it is difficult if not impossible to anticipate the ingenuity of all future attackers with a fixed set of rules. Third, users tend to ignore warnings about security dangers. Even the best warnings can be rendered useless by a user who does not heed the warning. The components and methods disclosed and described herein take these factors into account to provide a means for protecting against phishing attacks.

SUMMARY

The following presents a simplified summary in order to provide a basic understanding and high-level survey. This summary is not an extensive overview. It is neither intended to identify key/critical elements nor to delineate scope. Its sole purpose is to present some concepts in a simplified form as a prelude to the more detailed description later presented. Additionally, section headings used herein are provided merely for convenience and should not be taken as limiting in any way.

A phishing protection module identifies when a user attempts to enter protected security credentials, such as a user name and password, at a computing system that is not associated with the computing system for which the security credentials were created. The phishing protection module can access a blacklist of phishing sites to determine whether to allow submission of a security credential, whether to warn a user, of whether to disallow presentation of the security credentials and force the user to create new credentials if the user desires to access the blacklisted site.

A phishing protection server can accept and analyze reports of suspected phishing activity from a group of users. When a sufficient number of users report phishing activity, the phishing protection server can designate a computing system as a suspected phishing site. Additionally or alternatively, the phishing protection server can notify a trusted site that a phishing attack is underway against users of the trusted site and provide to the trusted site a list of usernames of those individuals whose accounts have likely been compromised.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

DETAILED DESCRIPTION

Figure 1:
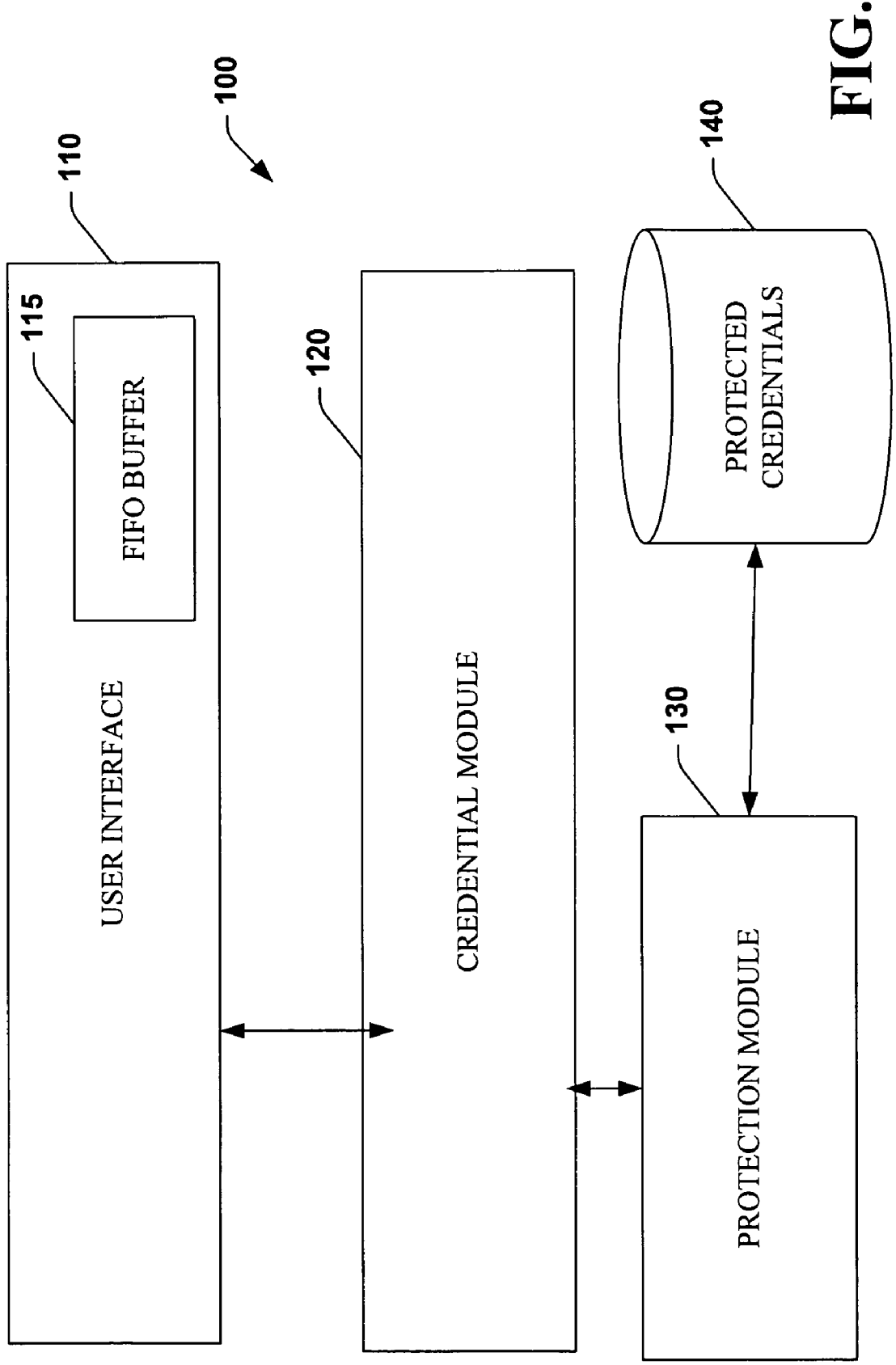
FIG. 1 is a system block diagram of a phishing prevention system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

FIG. 1 is a system block diagram of a phishing prevention system 100. The phishing prevention system 100 can be used to prevent unauthorized acquisition of security credentials, such as username and password combinations, by unauthorized third parties. Additionally or alternatively, the phishing prevention system 100 can be used to warn a user that he is the target of a phishing attack and reinforce good computing security practices.

The phishing prevention system 100 can work with, or be integrated into, a user interface 110. Specifically, the phishing prevention system 100 can be implemented as an add-on component, such as a plugin, for a web browser. The phishing prevention system 100 can also be implemented to work with an electronic mail reader or client, especially an electronic mail reader or client that supports the use of hypertext markup language (HTML) in messages.

Due at least in part to the nature of phishing attacks, the user interface 110 can be of great value in determining whether a user is a target of a phishing attack. For example, in one implementation, the user interface 110 can be a web browser. The use of a web browser can facilitate a phishing attack because it provides a platform upon which an attacker can reproduce the format, layout and content, including graphical content, of a trusted website. However, other capabilities of the web browser can be used to defeat an attempted attack. For example, the web browser can provide additional information about a source of the information displayed, such as a uniform resource locator (URL), an Internet protocol (IP) address, and a relatively standard format for obtaining and presenting user input. Such information can be used to verify content sources and protect personal information, specifically including security credentials. Further details are provided in conjunction with this and other drawings.

Similarly, an electronic mail reader or client that supports HTML use in messages can provide information that can be used to defeat an attempted phishing attack. In addition to the information that can be obtained from HTML code in a message, each electronic mail message includes a great deal of information in its headers. That information can also be used to verify content sources and protect personal information. Other information can be gleaned from particular features or functions of other components used to implement the user interface 110.

It should be noted that the term security credential does not merely include usernames and passwords. It can include other valuable information such as credit card numbers, social security numbers or other data that a user desires to prevent from getting into the wrong hands. Those of ordinary skill in the art will recognize that other types of security systems can be used in conjunction with components and methods disclosed and described herein. A security component can use a security scheme that operates according to one or more common security paradigms. Those paradigms are often described as who you are, what you know, or what you have.

Components that can be used in implementations based upon the security paradigm of who you are include a variety of biometric-based devices, such as fingerprint scanners and retina scanners, among others. For implementations using the what you know paradigm, a user name and password authentication system can be employed. In the category of implementations based upon what you have are systems that use security tokens and proximity detectors, such as radio frequency identification (RFID) tag-based systems. According to a desired level of security, one or more of the foregoing systems can be combined.

In each of these security systems, some security credential is created. In a biometric-based system, the security credential can be a descriptor of some identifying characteristic of the user. In an RFID-based system, the security credential can be an identifying signal created by the RFID tag in response to a polling signal. Other credentials are possible and depend upon a specific implementation. Additionally, as appropriate or required by context, security credentials can include a username, a password, or a username-password pair. Similarly, when an implementation combines two or more of the above-described security systems, a security credential can include a part of a combined or amalgamated credential as well as an entire credential. Although for ease of explanation examples presented herein discuss or focus on security credentials that include usernames and passwords, it will be readily recognized that components and methods disclosed and described herein can be easily adapted for use with other types of security credentials and that such modifications are able to be implemented by a person of ordinary skill in the art upon reading this disclosure.

The phishing prevention system 100 also includes a credential module 120. The credential module 120 can track use of credentials by a user and determine whether a specific security credential is being used or presented to a computing system. A variety of methods can be used to identify and obtain security credentials. Details of such methods are largely implementation-dependent.

In an implementation that operates with HTML pages, such as a web browser-based implementation, the use of relatively standard HTML forms makes identification of credentials on a non-malignant page relatively easy. A non-malignant page includes a page that makes no attempt to obscure or conceal the fact that it is gathering password or similar data. HTML forms support the use of data input fields for usernames and passwords that are passed from a web browser to a web server through invocation of the HTTP POST command. Information placed by a user in the username and password fields of an HTML form can be captured or otherwise obtained by a component like a browser plug-in before that information is sent over a network link to a computing system.

An additional or alternate implementation focuses not solely on data entry in well-defined and properly named fields but on keystrokes. For each key typed, the character corresponding to the typed key is placed in a data buffer such as a first-in, first-out (FIFO) buffer 115 of the user interface 110. The size of the FIFO buffer 115, and correspondingly the size of any security credential to be checked, can be arbitrarily limited to a certain number of characters, such as a length of the longest password that is expected to be encountered, for example, sixteen (16). A minimum value can also be implemented by padding too-short entries with other data. Similarly, longer passwords can be truncated for the purposes of identification described herein.

Upon accessing each keystroke, the credential module 120 can perform an encryption or other security-related operation, such as computing a hash function, on the data in the FIFO buffer. 115. The credential module 120 can pass the computed hash value to a protection module 130. The protection module 130 can compare the value of the hash function computed by the credential module 120 to entries in a protected credential data store 140 to determine whether a user has entered security credentials using the keyboard. The keyboard mentioned here is simply a preferred data entry tool. A person of ordinary skill in the art will realize from reading this disclosure that other data entry methods can be used.

The protected credential data store 140 can be any suitable or appropriate data store, such as a text file, a database, a linked list, or a data structure. In this specific example, the protected credential data store is described as a text file that includes a preselected maximum number of entries, for example, two hundred fifty six (256). This preselected maximum value is arbitrary and is merely selected to control storage space for the list. Another value, or no value at all, can also be chosen.

Entries in the list can be stored in the following format:

$$P_0 = \{dom, H_1, H_2\}$$

where dom is the domain name of the computing system from which an HTML form or other request for security credentials originated, $H_1$ is a hash of the password, and $H_2$ is a hash of the username. To control entries in the list, an appropriate entry replacement algorithm can be employed. One such algorithm is the least recently used (LRU) algorithm. A new entry replaces an entry deem to be the one that has least recently been used.

When replacing an entry, all entries are shifted as follows:

$$P_{k+1} = P_k \text{ for } k=0, \ldots, 254$$

is calculated before adding a new entry $P_0$ as described above. Entries in the protected credential data store 140 can initially be populated by a user entering known credential information for trusted sites as a batch or can be accumulated over time as a user navigates to a trusted site.

In operation, the phishing prevention system 100 can function as follows. A user can access a computing system through the user interface 110. As the user types characters at a keyboard connected with the user interface 110, each character is stored in the FIFO buffer 115. The credential module 120 accesses the string of characters stored in the FIFO buffer 115 and computes one or more hash function on that string. The computed hash values are sent to the protection module 130. The protection module 130 accesses a list of protected credentials stored in the protected credential data store 140. The computed hash function values from the credential module 120 is compared to entries in the list of protected credentials.

Figure 2:
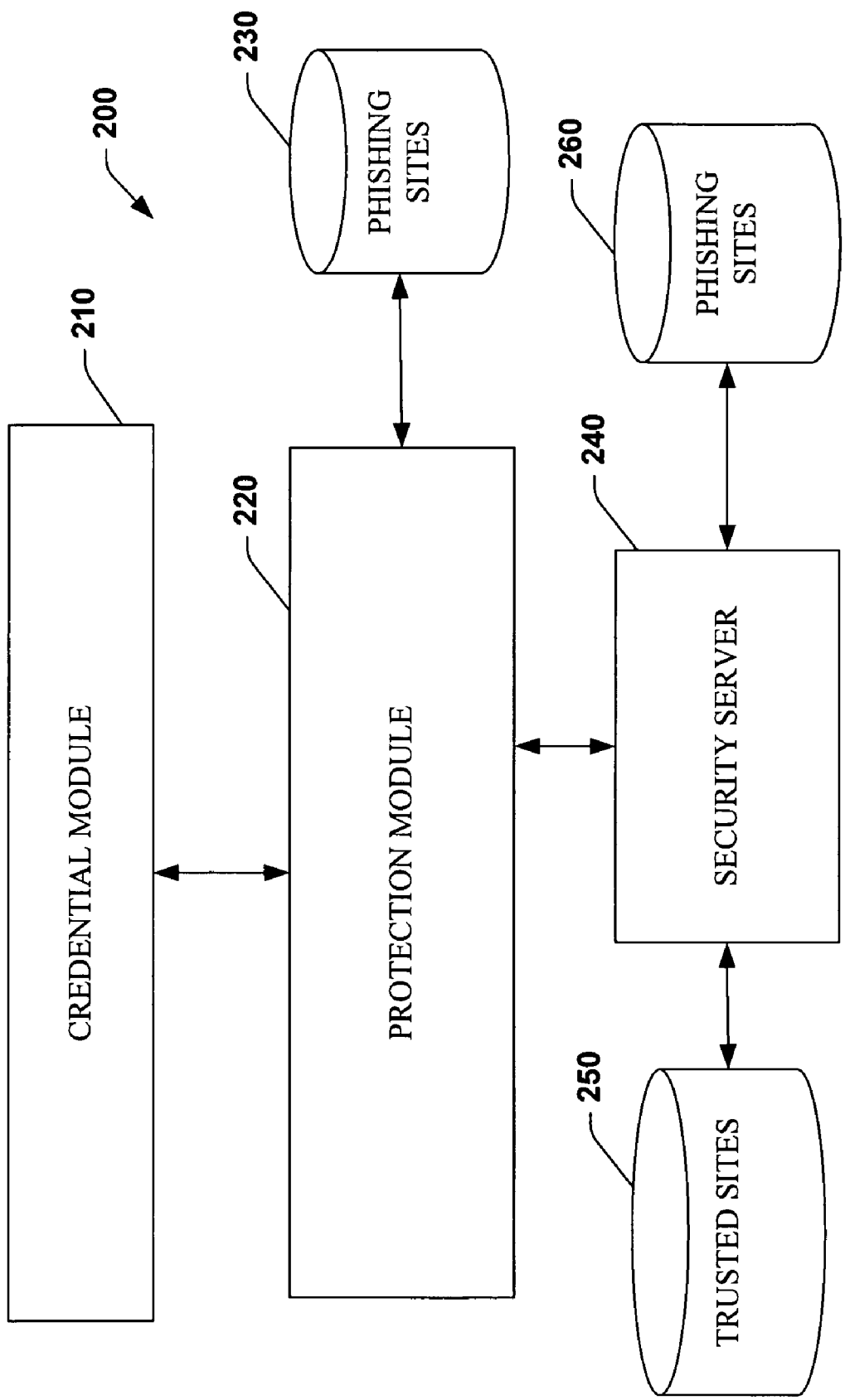
FIG. 2 is a system block diagram of a phishing prevention system.

FIG. 2 is a system block diagram of a phishing prevention system 200. The phishing prevention system 200 can be used to identify when security credentials are being entered or presented by a user at a computing system and associate such entry or presentation with a permitted or suspect use. Permitted uses can be pre defined by maintaining data about trusted computing systems with which the user can interact. Similarly, suspect uses can be predefined by maintaining data about insecure or suspected phishing sites.

The phishing prevention system 200 includes a credential module 210. The credential module 210 can be implemented in much the same way as the credential module 120 disclosed and described in conjunction with FIG. 1. Specifically, the credential module 210 can monitor input of security credentials by a user, calculate values from an appropriate hash function based upon the monitored input, and communicate the calculated values to other components.

In particular, the credential module 210 can pass the calculated values to a protection module 220. The protection module 220 can be implemented in a similar fashion as the protection module 130 disclosed and described above at in conjunction with FIG. 1. The protection module 220 can compare the value calculated by the credential module 210 to those values included in a protected credential data store 230. The protected credential data store can be implemented as disclosed and described above in conjunction with the protected credential data store 140 of FIG. 1. Of course, although the components of FIG. 1 can be used, other suitable components can also be used in their place.

If the protection module 220 determines that credentials passed to it to for evaluation by the credential module 210 are among the set of protected credentials stored in the protected credential data store 230, the protection module 220 can report this occurrence to a security server to 240. The security server 240 can be a component residing on the same machine as the credential module 210 and the protection module 220. Alternatively, the security server 240 can be implemented on the remote machine and a client-server architecture. To add a layer of redundancy, more than one security server 240 can be employed. For example, a first security server can be located on a local machine and a second security server can be located on a remote machine. Other configurations are also possible.

The security server 240 can access a trusted site data store 250 and a phishing site data store 260. Security credentials received by the security server 240 from the protection module 220 can include a domain name that is associated with the security credential. In particular, the security server 240 can receive a vector that includes all legitimate domains that share the same password. The security server 240 can compare the instant use of the security credential with information from the trusted site data store 250 to determine whether the user is entering security credentials at a trusted site. If so, there is no further need for action.

The possibility also exists that to the user is entering security credentials at a suspected phishing site. To guard against this scenario, the security server 240 can compare the received security credentials against entries in a phishing site data store 260. Entries in the phishing site data store 260 include domain names or other identifiers such as IP addresses of computing systems that are suspected to being engaged in phishing exploits. To populate this data store, a variety of methods can be used.

One specific method that is contemplated to populate entries in the phishing site data store 260 includes aggregating data from among multiple users. For example, a group of users can each have their own protected security credentials. When a phishing protection system determines that one of those users has entered protected security credentials at an untrusted site, such an occurrence can merely indicate that a user is merely reusing security credentials among multiple computing systems. Although reuse of security credentials is a disfavored practice, is not, in and of itself, indicative of a phishing attack. However, when a second user enters protected credentials at the same computing system as the first user, that event can be used as an indication that the computing system at which both users presented protected security credentials may be phishing and that the site warrants further scrutiny.

When a computing system has been deemed worthy of further scrutiny because suspected of engaging in possible phishing attacks, the security server 240 can cause a warning to be displayed to the user that indicates that the user should exercise additional caution before proceeding to submit or actually submitting security credentials to that site. In this specific example, the user can override the warning from the security server 240 and present his security credentials to the computing system suspected of phishing. In other implementations, this option can be disallowed.

When a computing system that is already under scrutiny is further identified as a computing system to which still other users are attempting to present security credentials, that system can be deemed to be engaged in phishing. Some predetermined number of discrete reporting events can be chosen as a triggering threshold to change the status of a computing system from under scrutiny to engage in phishing. One appropriate threshold is 5 or more individual reports of suspected phishing activity are received.

In cases where the security server 240 determines that a computing system is engaged in phishing, it can report that fact to the protection module 220 in response to a request for this information from the protection module 220. Additionally or alternatively, the security server 240 can broadcast a copy of a list of suspected phishing sites to all protection modules with which the security server 240 can communicate or to a subgroup of those protection modules. The protection module 220 can then notify the user that the computing system to which the user has attempted to present protected security credentials is engaged in phishing and block the use of those protective security credentials with the phishing site. In one specific example, the protection module 220 will not completely prevent a user from accessing the phishing site. The protection module 220 will merely prevent the user from submitting protected security credentials to the suspected phishing site, thereby forcing the user to create a new security credential for use with the phishing site. Alternative approaches, including but not limited to completely blocking access to the phishing site, can also be employed.

One possible example of the operation of the phishing prevention system 200 follows. The credential module 210 monitors keystrokes of a user for use to determine whether a security credential has been entered. On each key press, the credential module 210 calculates a hash function value based upon one or more keystrokes. The credential module 210 sends the computed hash function value to the protection module 220. The protection module 220 compares the hash function value to a list of values that represent protected security credentials stored in the protected credential data store 230.

When the protection module 220 determines that a user has entered protected security credentials, for example, by finding a match between the hash function value and an entry in the protected credential data store 230, the protection module 220 reports this information to the security server 240. Specifically, the protection module 220 sends a hash of the username and domain at which protected security credentials are to be presented. The security server 240 compares the domain name sent by the protection module 220 with a set of domain names for trusted sites in the trusted site data store 250. If the domain at which the security credentials are to be presented is a trusted domain, the security server 240 can report that fact to the protection module 220. The protection module 220 can then allow the user to proceed to submit the protected security credentials.

If the security server 240 cannot locate the domain at which the security credentials are to be presented in the set of trusted sites, the security server 240 can compare the domain name against a set of domain names associated with suspected phishing sites in the phishing site data store 260. If the domain name is one that is associated with a suspected phishing site, the security server 240 can indicate that fact to the protection module 220. If the domain name is not included in either the set of trusted sites or the set of suspected phishing sites, the security server can send an appropriate warning message to the protection module 220.

Figure 3:
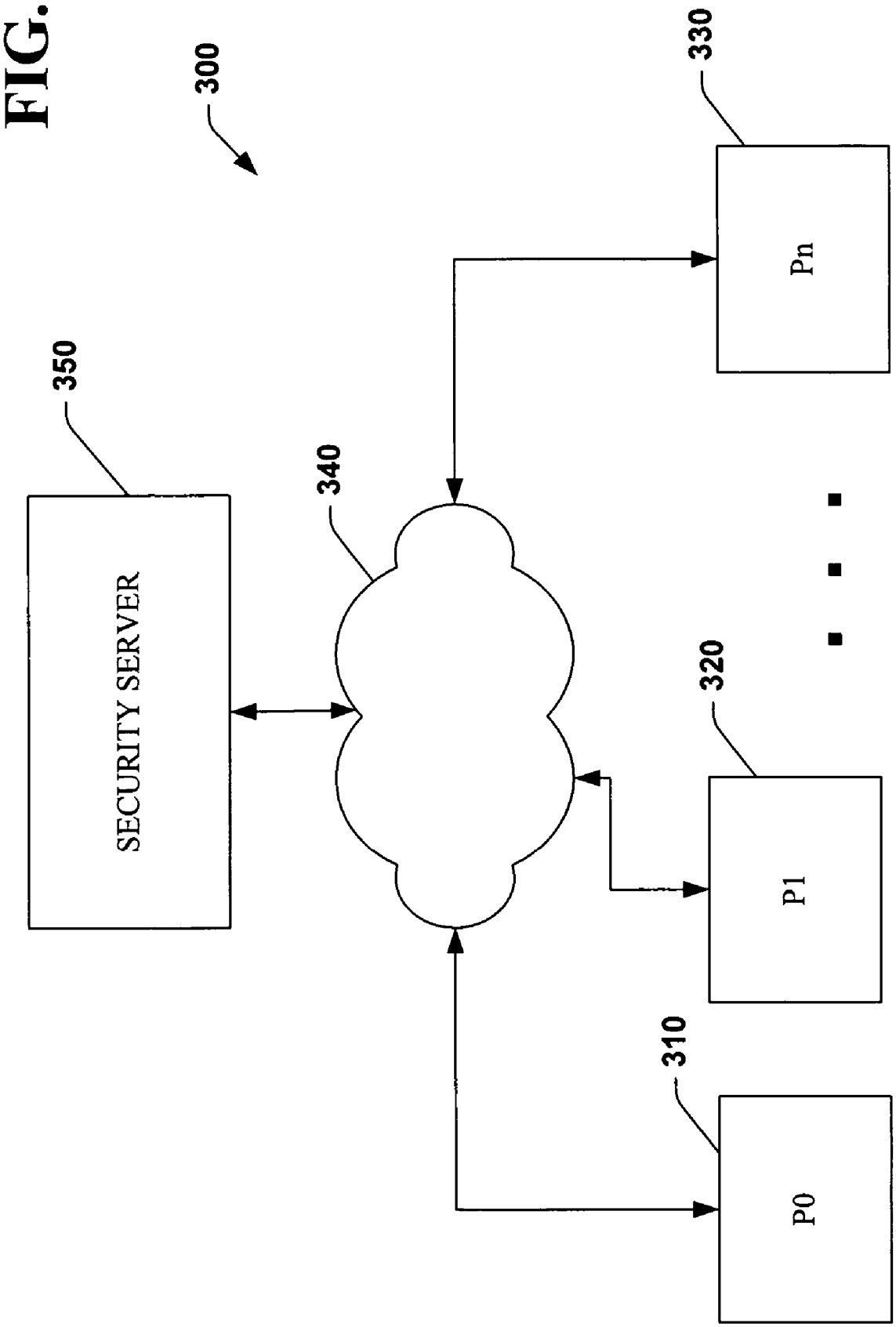
FIG. 3 is a system block diagram of a phishing reporting system.

FIG. 3 is a system block diagram of a phishing reporting system 300. The phishing reporting system 300 can be used to aggregate or collect information regarding use of security credentials from multiple users. In turn, the aggregated or collected information can use to identify computing systems that are suspected of phishing.

The phishing reporting system 300 includes a group of phishing prevention components 310, 320, 330. Each of the phishing prevention components 310, 320, 330 can monitor for the input of protected security credentials on a user's machine. Specifically, previously disclosed and described phishing prevention modules, for instance, the phishing prevention module 100 of FIG. 1 or the phishing prevention module 200 of FIG. 2 can be used to implement any one of the phishing prevention components 310, 320, 330. Additionally or alternatively, another suitable phishing prevention component can be used.

Each of the phishing prevention components 310, 320, 330 can communicate with other components by using a communication network 340. The communication network 340 can be any suitable communication network and specifically can be wired or wireless. Types of suitable wired networks include Ethernet networks, Token Ring networks, or any IP-based communications system. Appropriate wireless networks include IEEE 802.11x (WiFi) networks, IEEE 802.16 (WiMax) networks, code Division multiple access (CDMA) systems, Time Division multiple access (TDMA) systems, Global System for Mobile Communications (GSM) Systems, and Bluetooth systems, among others.

By using the communication network 340, each of the phishing prevention components 310, 320, 330 can access a security server 350. The security server 350 can track, aggregate, and analyze reports of protected security credential use to determine whether a computing system is engaged in phishing the taps. A suitable method for identifying phishing attempts includes setting the threshold number of reports as previously discussed in conjunction with FIG. 2. Other methods, approaches, or algorithms can also be used to identify suspected phishing sites.

Figure 4:
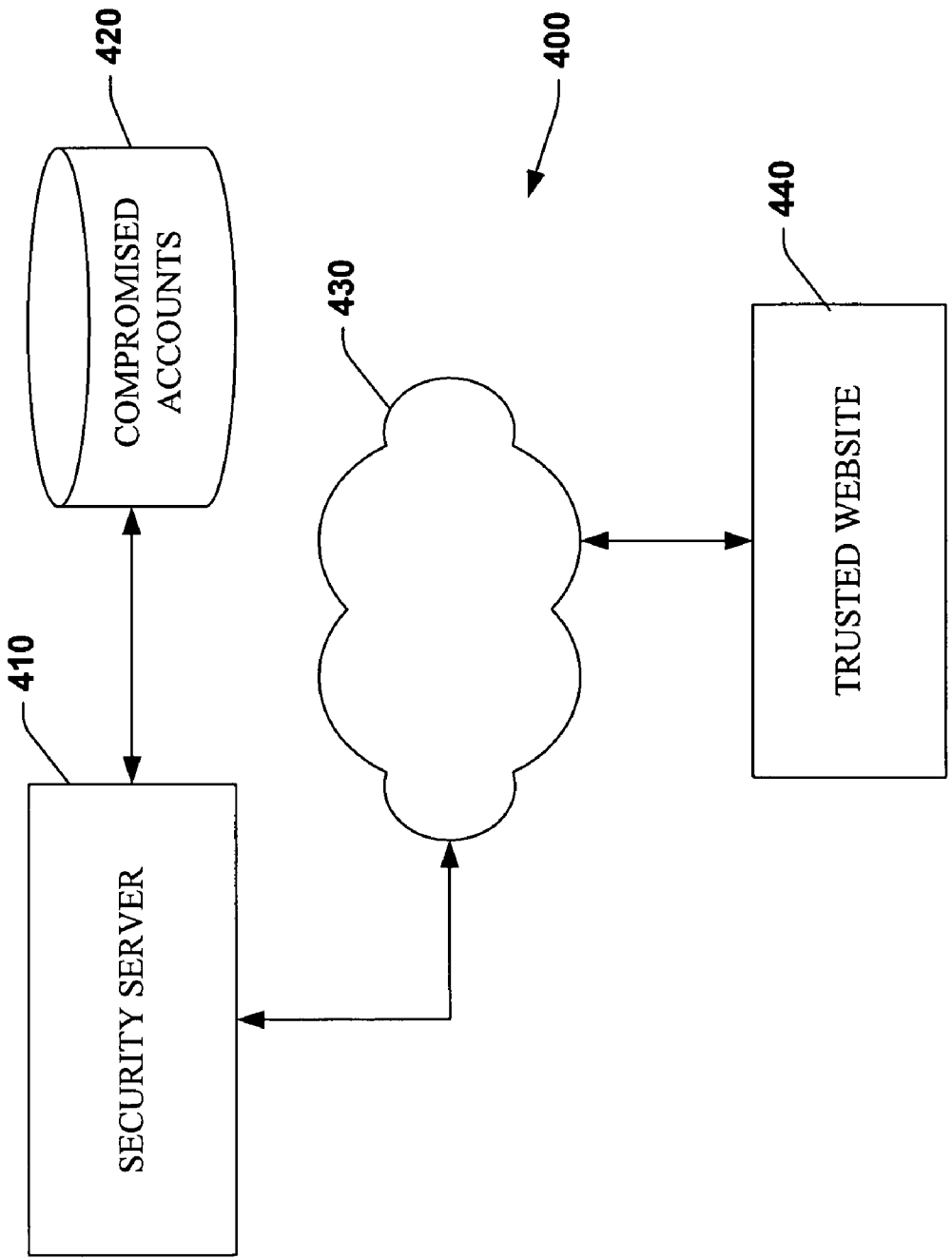
FIG. 4 is a system block diagram of a phishing reporting system.

FIG. 4 is a system block diagram of a phishing reporting system 400. The phishing reporting system 400 can be used to warn trusted sites that phishing attacks are occurring and that such attacks are targeting users of those trusted sites. It can also inform the trusted site about which users have had their security credentials compromised. Additionally or alternatively, the phishing reporting system 400 can be used to notify the users of trusted sites that their security credentials for those trusted sites have been compromised through a phishing attack.

The phishing reporting system 400 includes a security server 410. The security server 410 can be implemented in a similar fashion as any of the previously disclosed in described security servers, for example, the security server 350 of FIG. 3. The security server 410 can access a compromised account data store 420. Information in the compromised account data store 420 can be compiled from multiple reports of the presentation of protected security credentials at untrusted or phishing sites. Specifically, when the security server 410 receives reports of suspected phishing activity, such as when a phishing protection module reports a user name and domain to the security server 410, the security server 410 can store information about the usernames and domains.

When the security server 410 determines that users may fall or have fallen victim to phishing attacks, a group of user names can be placed in the compromised accounts data store 420. The security server 410 can then access the communication network 430 to notify a trusted site 440 that users of the trusted site 440 may fall or have fallen victim to a phishing attack. The communication network 430 can be any appropriate communication network, such as the Internet, a corporate intranet, a local area network (LAN), or a wide area network (WAN), among others.

To report to a list of user names to the correct trusted site, the security server can contact each reporting phishing protection module to obtain the name of this site that is associated with the protected security credential reported as used. Alternatively, the security server 410 can gather this information as part of the initial report from each phishing protection module. Other methods can also be used. Further, the user names can be collected in hash form. Since the trusted site has a list of all their users names, it will be easy for the trusted site to identify the compromised accounts by using the hash of the user names, but it would be hard for someone else to do the same.

In operation, the phishing reporting system 400 can function as follows. The security server 410 can receive a group of reports of usage of protected security credentials from multiple phishing protection modules. The security server 410 can group user names of users associated with a specific site in the compromised accounts data store 420. When the security server 410 determines that a site is engaged in phishing attacks, the security server 410 can transmit a list of user names to the trusted site with which those user names are connected. The list of user names can be hashed, encrypted, or otherwise protected by some security mechanism supported by both the security server 410 and the trusted site 440.

Figure 5:
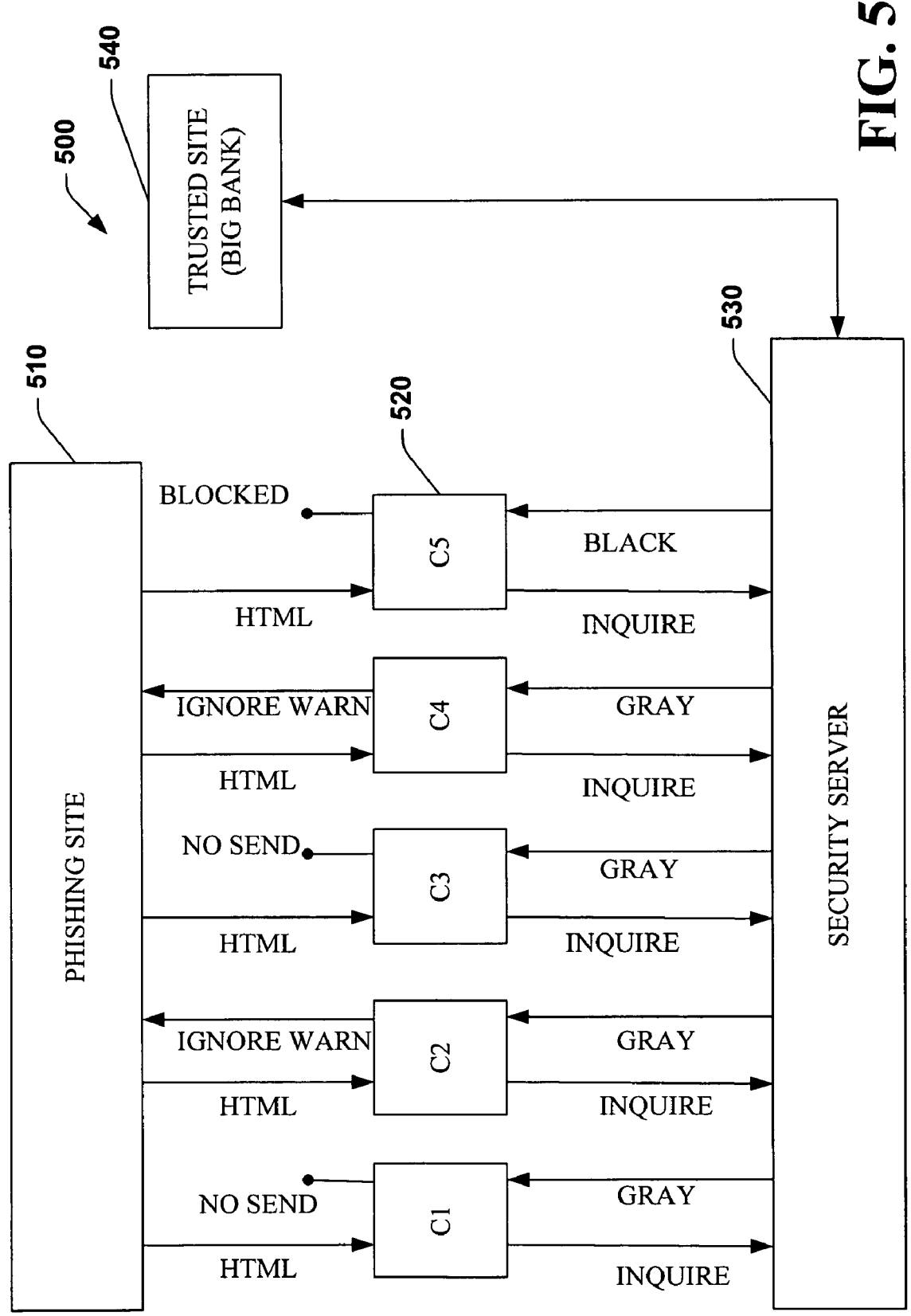
FIG. 5 is a data flow diagram depicting data flows between and among components a phishing protection system.

FIG. 5 is a data flow diagram illustrating data flows between and among components a phishing protection system 500 during an exemplary attack. In this figure, a server 510 belonging to a site engaged in phishing has sent a group of HTML messages to a group of clients 520 in an attempt to obtain user security credentials for accounts of those users at a trusted domain called BigBank.com. The phishing server 510 sends an HTML message to client C1 to attempt to obtain the security credentials of C1. C1 sends an inquiry to a security server 530. At this point, the security server 530 has no indication that a phishing attack is underway but also cannot determine that the site to which C1 intends to submit his security credentials is a trusted or whitelisted site. The security server 530 indicates this fact by sending a gray warning to C1. C1 heeds the warning and does not submit his security credentials.

C2 also sends an inquiry to the security server 530. The security server 530 still has not determined that the phishing attack is underway. The security server 530 sends a gray warning to C2. C2 ignores the warning and submits his security credentials to the phishing site, thereby compromising his account. The security server 530 logs the fact that C2 has submitted his credentials. Data flows for C3 and C4 follow those of C1 and C2, respectively.

C5 also notifies the security server 530 that he intends to submit his security credentials to the phishing site. At this point, the security server 530 determines that the phishing server 510 is engaged in phishing attacks. The security server 530 sends a response to C5 that indicates that the phishing server 510 has been blacklisted for phishing. C5 is blocked from submitting his protected security credentials to the phishing server 510.

The security server 530, upon determining that the phishing server 510 is engaged in phishing attacks, compiles a list of user names associated with users who have submitted protected security credentials to the phishing server 510. In this example, the affected users are C2 and C4. The security server 530 notifies the trusted server 540 that the accounts of users C2 and C4 have been compromised. The trusted server 540 can take preventative, remedial, or other actions to protect users C2 and C4, for example, by restricting access to those accounts until the respective owners can be contacted or by another appropriate method. Furthermore, the security server 530 can decide to also inform the trusted site 540 about C1, C3, C5, and any subsequent requests. This is useful because in some kind of attacks, partial information about an account may have been compromised, even if the final information is not submitted.

The security server 530 can use a variety of methods in addition to, or as alternatives to, the procedure disclosed and described above. Specifically among those methods are data mining methods that can be used to identify patterns in reports from clients. Patterns can be found in the content of such reports, for example, when multiple client reports indicate use of protected security credentials at a new site. Patterns can also be found in how the reports themselves are received, for example, in timing and volume of reports from clients. Other techniques can also be used.

Figure 6:
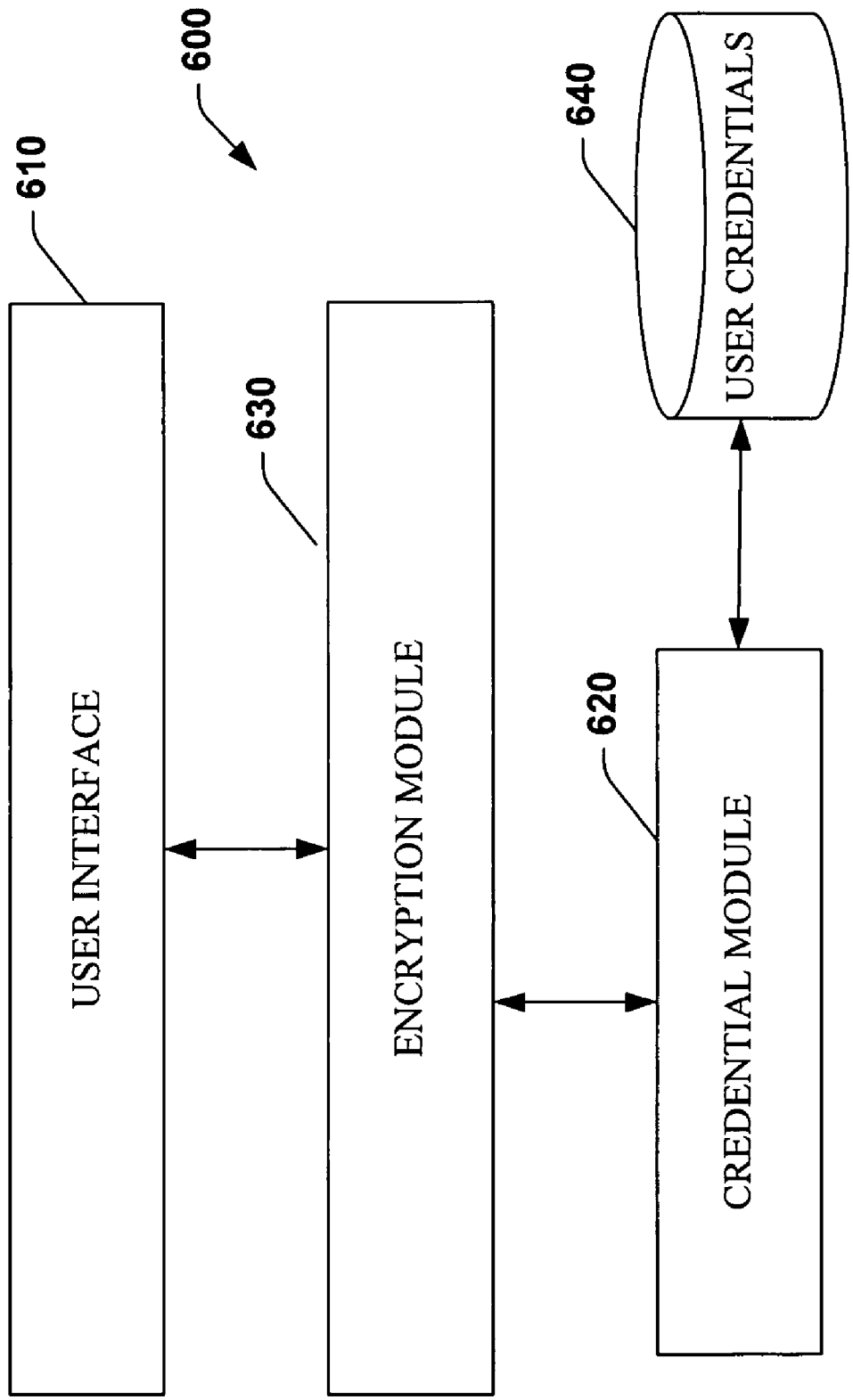
FIG. 6 is a system block diagram of a user credential security system.

FIG. 6 is a system block diagram of a user credential security system 600. The user credential security system 600 can be used to protect security credentials of users. Additionally, the user credential security system 600 can be used to determine when a user is entering protected security credentials for use with a computing system.

The user credential security system 600 includes a user interface 610. The user interface 610 can be inappropriate user interface, and specifically can be any of the user interfaces disclosed and described in conjunction with previous figures. In particular, the user interface 610 can be responsive to data input from the keyboard or another suitable data entry device.

A credential module 620 can access data entered at the user interface 610. Specifically, the credential module 620 can take information, such as information entered by an individual keystroke, from the user interface 610 and forward that information to an encryption module 630. The encryption module 630 can encrypt or otherwise protect information from the user interface 610.

Specifically, in this example, the encryption module 630 can use a specific hash function to protect the information of protected security credentials and can recreate that hash function to apply to data obtained from the user interface 610 so that the credential module 620 can compare the data entered at the user interface 610 with information included in a set of protected security credentials in a user credential data store 640. To initially create entries in the user credential data store 640, the encryption module 630 uses information from three fields. The domain associated with the security credentials to be protected can be stored in the clear or encrypted or otherwise obfuscated for privacy. The other two fields are hashes of the password and username. The encryption module 630 can create a hash, such as an SHA-1 hash of the user name. The security of the hash can be further improved by adding a salt.

The encryption module 630 can use a slow hash to protect passwords. In this example, the password space is required to be at least 1e13 in size. To avoid security breaches through attacks such as dictionary attacks and attacks using precomputed hash tables, a client-specific salt is added to the password. Additionally, an entry-specific salt can be added to each individual entry to prevent an attacker from gaining information about password reuse habits of a user.

A specific hash function that can be employed is a type of recursive hash that can be built based on any standard hash function. In this example, the SHA-1 hash function is used as a base from which to build the recursive hash. First, in this example, passwords can be limited to between 7 and 16 characters. Second, at each key entry the encryption module 630 must compute 2560 different hashes because there are 10 possible password lengths and each entry for a protected security credential has an entry-specific salt. Because these 2560 hashes are not hashes of independent strings, the hash function can be designed such that all 2560 hashes can be computed in approximately the same time as it would take an attacker to compute a single hash.

At some initial time, such as when components of the disclosed and described systems are installed on a computing platform, the encryption module 630 measures the number of SHA-1 hashes that can be computed in a predetermined time span, for instance, 10 milliseconds, on the host computing system. This value is referred to as N. To compute a hash of the password, the encryption module 630 concatenates the last 7 characters of the password with the client-specific salt. This salt can be random and need not be secret, although it can be secret if desired in a specific implementation. The salt needs to vary from client to client to avoid a precomputed hash preimaging attack.

The encryption module 630 recursively computes the hash of the concatenated string N times. The resulting hash is concatenated with an eighth character and the resulting string is recursively hashed N/2 times. The ninth character is then concatenated and the resulting string is hashed recursively N/4 times, or half as many times as in the preceding stage. This process continues until all characters of the password have been included. Finally, the last result is concatenated with the entry-specific salt and a hash is computed one final time. Regardless of the length of the password, the whole process requires fewer than 2N hashes to be performed.

When a key press event occurs, the encryption module 630 takes the last 7 characters in the FIFO buffer, concatenates those characters with the client-specific salt, and recursively computes the hash of this string N times. This hash is referred to as H7. For each entry in the user credential data store 640, the encryption module 630 concatenates the resulting hash string (for example, H7) with the appropriate entry-specific salt, computes the hash of that string, and compares the hash with the appropriate entry of the user credential data store 640. If the last 7-character corresponds to any 7-character hash entry in the table, that correspondence can be identified. The eighth character is concatenated with H7 and the hash recursively computed N/2 times, to produce H8. H8 is concatenated with each of the entry-specific salts for comparison with each 8-character string in the table and identification of a match. This procedure is repeated until 16 characters are used from the FIFO buffer. The total number of hashes to be performed is less than 2N+256*10.

To mitigate any security risk from storing passwords on a machine, not only is the size of the password space intentionally large, the form of the password itself can also be manipulated such that an attacker will encounter difficulty. For example, the password can be required to have at least one numeric character, one special character, one lower case character, one upper case character, or be of a minimum length. Other password creation schemes, including combinations of these listed schemes, can also be used.

The credential module 620 can be used to send a message to a security server, such as the security server 410 of FIG. 4, that indicates that a user has entered protected security credentials at an untrusted site. There is a possibility that false positives indicating phishing attacks can be generated. In one possible case, the user can mistakenly type a username and password for a trusted site at an untrusted site. Such event will generate a report. In another scenario, the user can simply be reusing the same credentials for both a trusted and an untrusted site. Finally, the user could have been deceived by a phishing attack.

When a user is accessing a site at a public terminal, at least two potential problems arise. First, hashes of the account details for that user can be left on the public terminal. Second, the user's protected list can be unavailable. To mitigate the first problem, a waiting list can be used. With use of a waiting list, the first two times a username is typed at a specific site, only the domain name and a short, for instance, eight bits, has of the username is placed in the waiting list. The third time the username is typed at that site, the information is moved to the list of protected credentials as a full entry including a full hash of the password. Length of the waiting list can be arbitrarily set at some preselected number, for example, 16. To mitigate the second problem, the user's protected list can be stored on a remote server.

In one possible implementation, a client software module, such as a plugin for a web browser, detects when passwords and userids are used on a web page. Passwords are detected from the HTML password field and a potential source for obtaining the userid is any whitespace free text field of a length between six (6) and forty (40) characters that appears on the same page as a password field. If there is more than one possible userid field, each such field is considered as a possible userid and each is placed into the protected list.

Hashes of the userid(s), and password, along with the domain with which they are associated, are stored in the protected list. The browser plugin also maintains a FIFO buffer of the last few characters, for example, sixteen (16), that are typed while the browser has focus. At each keystroke, the browser plugin checks to determine whether a hash of the last seven (7) characters, or a hash of the last eight (8) characters, and so on, up to a hash of the last sixteen (16) characters, matches any of the hashes of passwords already stored in the protected list. If a match is made and if any domain not on a cleared list has had access to any of the characters in the password, the browser plugin sends a report to the security server.

The security server compares the report with other received reports and any other information available to determine whether there is enough data to decide that an attack is in progress. For example, a large number of reports declaring password reuse events from domain1 to domain2 in a short period of time can trigger such a determination. In addition, the security server can use information such as traffic information in making this determination. For instance, high traffic sites are less likely to be suspect. If a site is determined to be suspicious, the security server can inform the domain(s) under attack, inform the compromised clients, or take other action to stop the attack.

The disclosed and described components, for example in connection with identification or management tasks, can employ various artificial intelligence-based schemes for carrying out various aspects thereof. For example, identification of a phishing can be carried out by a neural network, an expert system, a rules-based processing component, or an SVM.

A classifier is a function that maps an input attribute vector, $X=(x_1, x_2, x_3, x_4, \ldots x_n)$, to a confidence that the input belongs to a class, that is, $f(X)=\text{confidence(class)}$. Such a classification can employ a probabilistic and/or statistical-based analysis (for example, factoring into the analysis utilities and costs) to prognose or infer an action that a user desires to be automatically performed. In the case of a phishing protection system, for example, attributes of security credential usage can be used to determine whether a site is phishing or whether an innocent password reuse has occurred.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to determining whether a device should be sent data.

With reference to FIGS. 7-10, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that are shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 7:
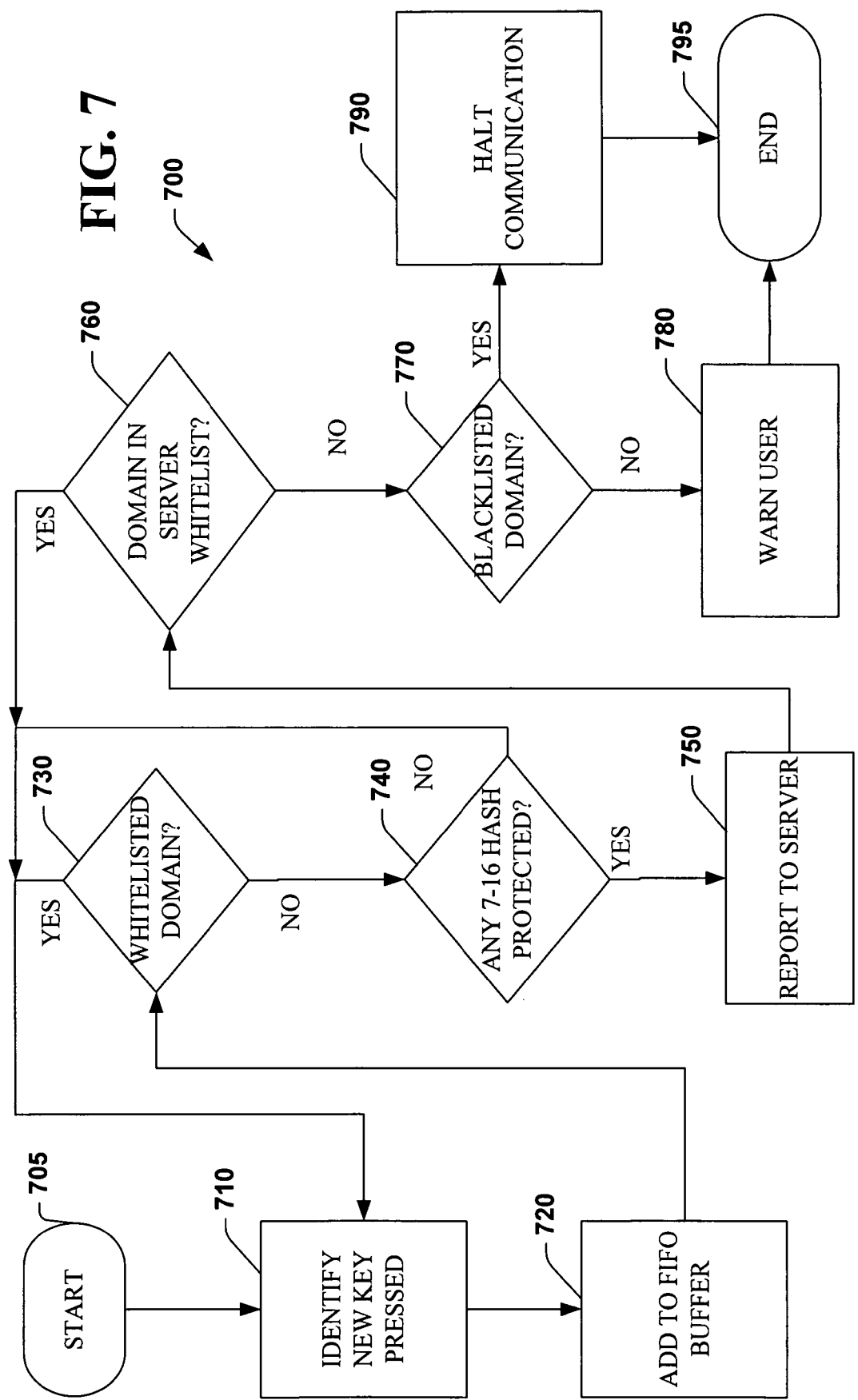
FIG. 7 is a flow diagram of a method that can be employed in conjunction with components have been disclosed and described herein.

FIG. 7 is a flow diagram of a method 700 that can be employed in conjunction with components have been disclosed and described in conjunction with earlier figures. Specifically, the method 700 can be used to determine whether a user is presenting protected security credentials at an untrusted site. The method 700 can also be used to protect users by providing appropriate warnings or halting communications with untrusted sites.

Processing of the method 700 begins at START block 705 and continues to process block 710 where a new key press is detected. Processing continues to process block 720 where a character associated with that key is added to the FIFO buffer. At decision block 730, a determination is made whether a domain currently being visited by a user is included in the user's protected list or whitelist. If so, processing returns to process block 710.

If the currently-visited domain is not in the user's protected list, processing continues to a decision block 740 where the determination is made whether any of the hashes calculated from characters 7 through 16 of the FIFO buffer are included in the protected list. If no, processing returns to process block 710. If yes, at process block 750 a report is made to a security server. At decision block 760, a determination is made whether the domain currently being visited by the user is included in a server whitelist. If yes, processing returns to process block 710. If no, processing continues to decision block 770.

At decision block 770, a determination is made whether the domain currently being visited by the user is included in a blacklist of sites known to be engaging in phishing attacks. If no, processing continues to process block 780 where a warning is presented to the user. If yes, the connection to the blacklisted site is halted at process block 790. Processing from either process block 780 or process block 790 terminates at END block 795.

Figure 8:
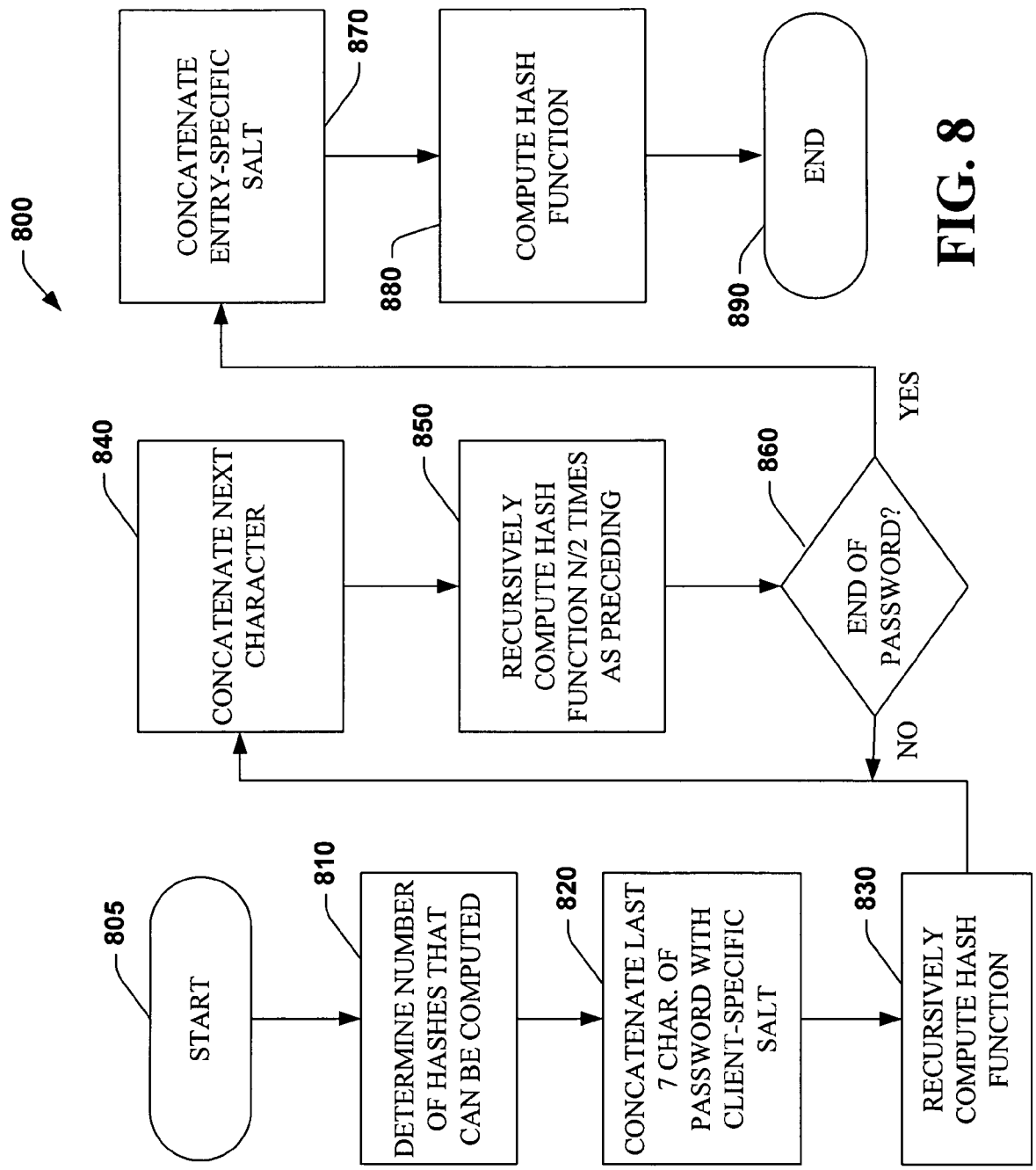
FIG. 8 is a flow diagram of a general processing method that can be used in conjunction with components that have been disclosed and described herein

FIG. 8 is a flow diagram of a general processing method 800 that can be used in conjunction with components that have been disclosed and described herein. Specifically, the general processing method 800 can be used to compute hash functions. These hash functions can be used to protect a users and security credentials initially or as part of an attempt to determine whether a user is entering protected security credentials at a keyboard.

Processing of the general processing method 800 begins at START block 805 and continues to process block 810. At process block 810, a calculation is performed to determine the number of hashes that can be computed in some predefined time interval, such as 10 milliseconds. At process block 820, the last 7 characters of the password are concatenated with a client-specific salt. Processing continues to process block 830 where a hash of the concatenated string is recursively performed the number of times possible in the predefined time interval.

At process block 840, the next character is contaminated with the hashed string. processing continues to process block 850 where the hash function is recursively performed on the string half as many times as in the proceeding step. At decision block 860, a determination is made whether the end of the password has been reached. If no, processing returns to process block 840. If yes, processing continues to process block 870 where an entry-specific salt is concatenated with the hashed string. Processing then continues to process block 880 where a final hash of the concatenated string, including the entry-specific salt is computed. Processing terminates at END block 890.

Figure 9:
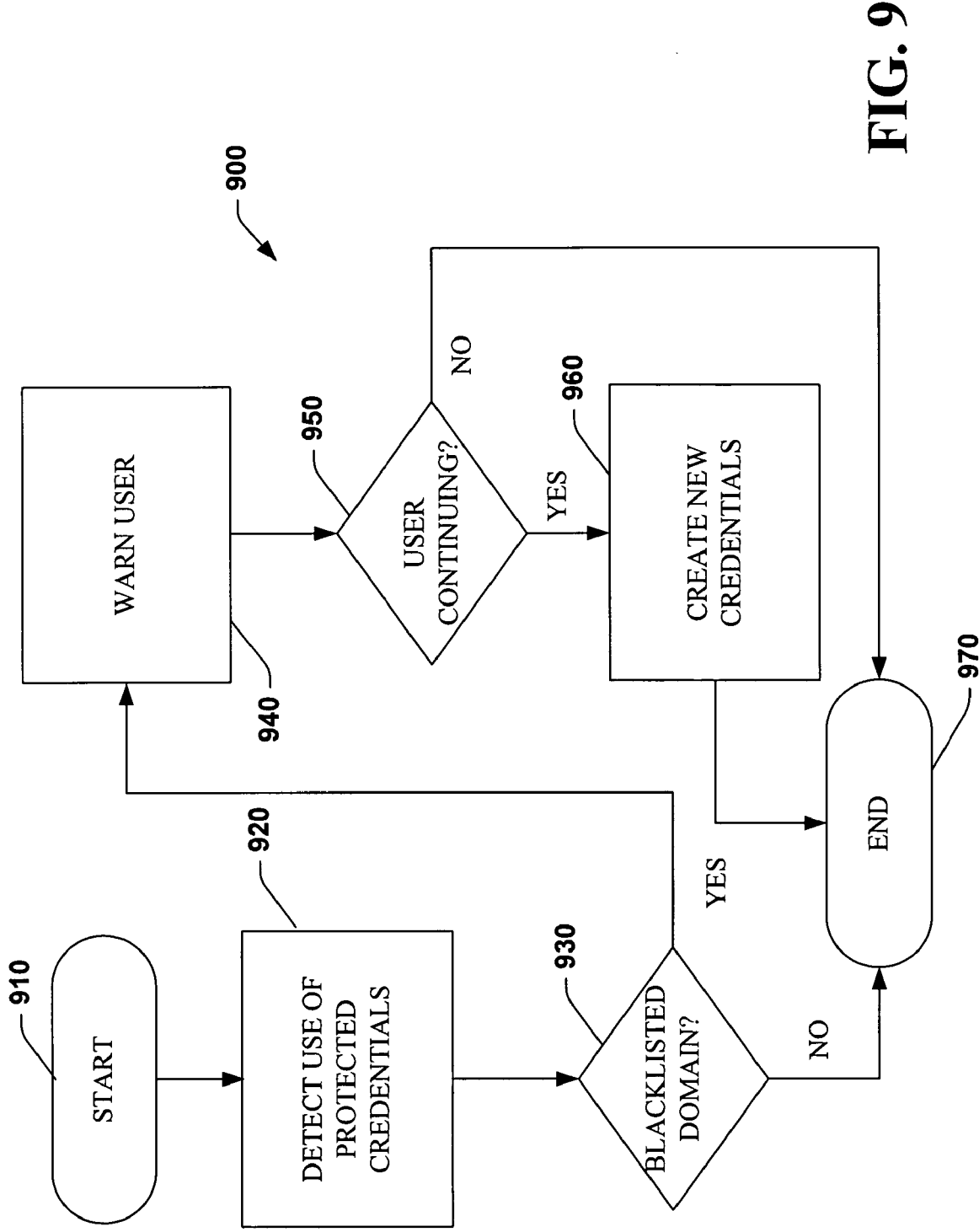
FIG. 9 is a flow diagram of a general processing method that can be used in conjunction with disclosed and described components.

FIG. 9 is a flow diagram of a general processing method 900 that can be used in conjunction with previously disclosed and described components. The general processing method 900 can be used to prevent a user from entering protected security credentials at a phishing site. Additionally, the method 900 can be used to force a user to create new security credentials when accessing a site that has been determined to be engaging in phishing attacks, thereby preventing transmission of protected security credentials to a phishing site.

Processing of the method 900 begins at START block 910 and continues to process block 920. At process block 920, use of protected security credentials is detected. Processing continues to a decision block 930 where the determination is made whether the user is attempting to use protective security credentials at a blacklisted site or a site that otherwise is not trusted. If the determination made at decision block 930 is yes, processing continues to process block 940 where a warning is presented to the user. At decision block 950, a determination is made whether the user desires to ignore the warning and continue. If yes, processing continues to process block 960 where the user is forced to create a new security credential for that website. Processing from a no determination made at to decision block 930, a no determination made at decision block 950, or from process block 960 terminates at END block 970.

Figure 10:
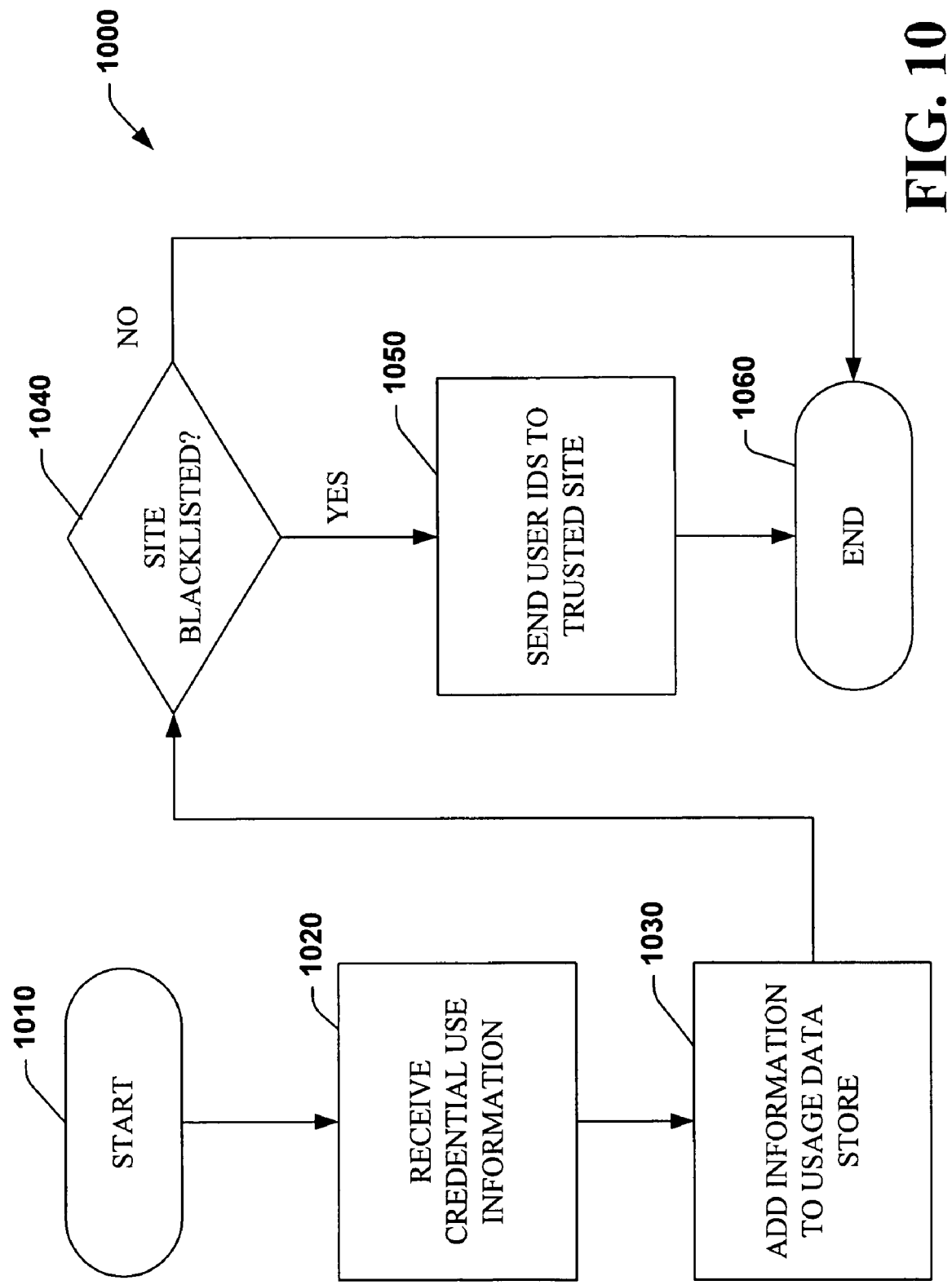
FIG. 10 is a flow diagram of a general processing flow that can be used in conjunction with components disclosed or described herein.

FIG. 10 is a flow diagram of a general processing flow 1000 that can be used in conjunction with disclosed or described components previously presented in conjunction with other figures. The general processing flow 1000 can be use to inform a trusted site that a phishing attack is being conducted against users of that trusted site. Additionally, the general processing flow 1000 can be used to identify to the trusted site those users who have fallen victim to the phishing attack and thereby had their accounts compromised.

Processing of the general processing flow 1000 begins at START block 1010 and continues to process block 1020 where credential usage information of the user is received. Processing continues to process block 1030 where the received information is added to a usage data store. At decision block 1040, a determination is made whether a site at which a user has presented protected credentials should be added to the blacklist. If this determination is yes, processing continues to process block 1050 where user names of users who have presented protected security credentials to a phishing site are sent to the trusted site whose users are under attack. Processing from process block 1050 terminates at END block 1060. Similarly, if the determination made at decision block 1040 is no, processing terminates at END block 1060.

Figure 11:
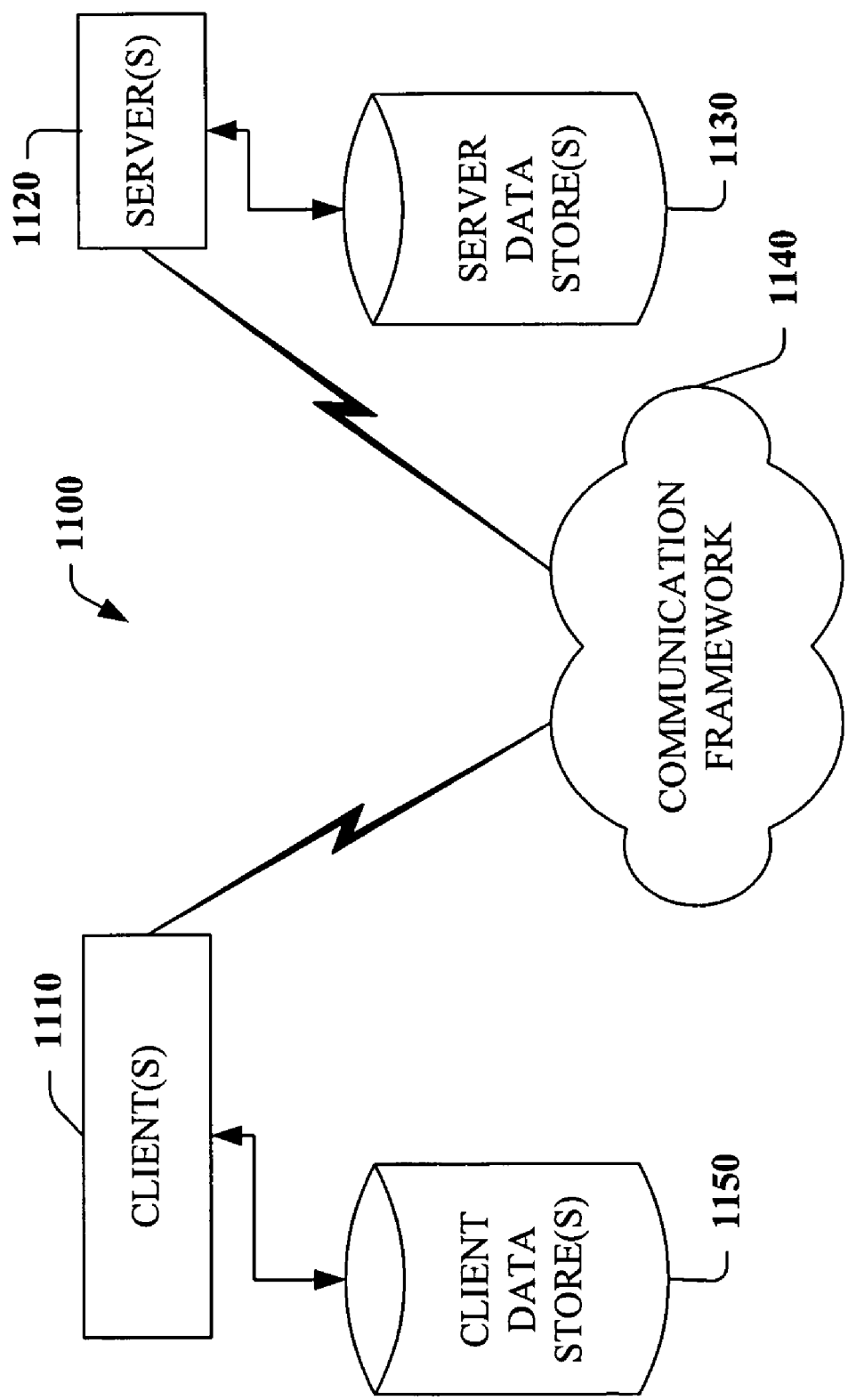
FIG. 11 is a system block diagram of a general networking environment.
Figure 12:
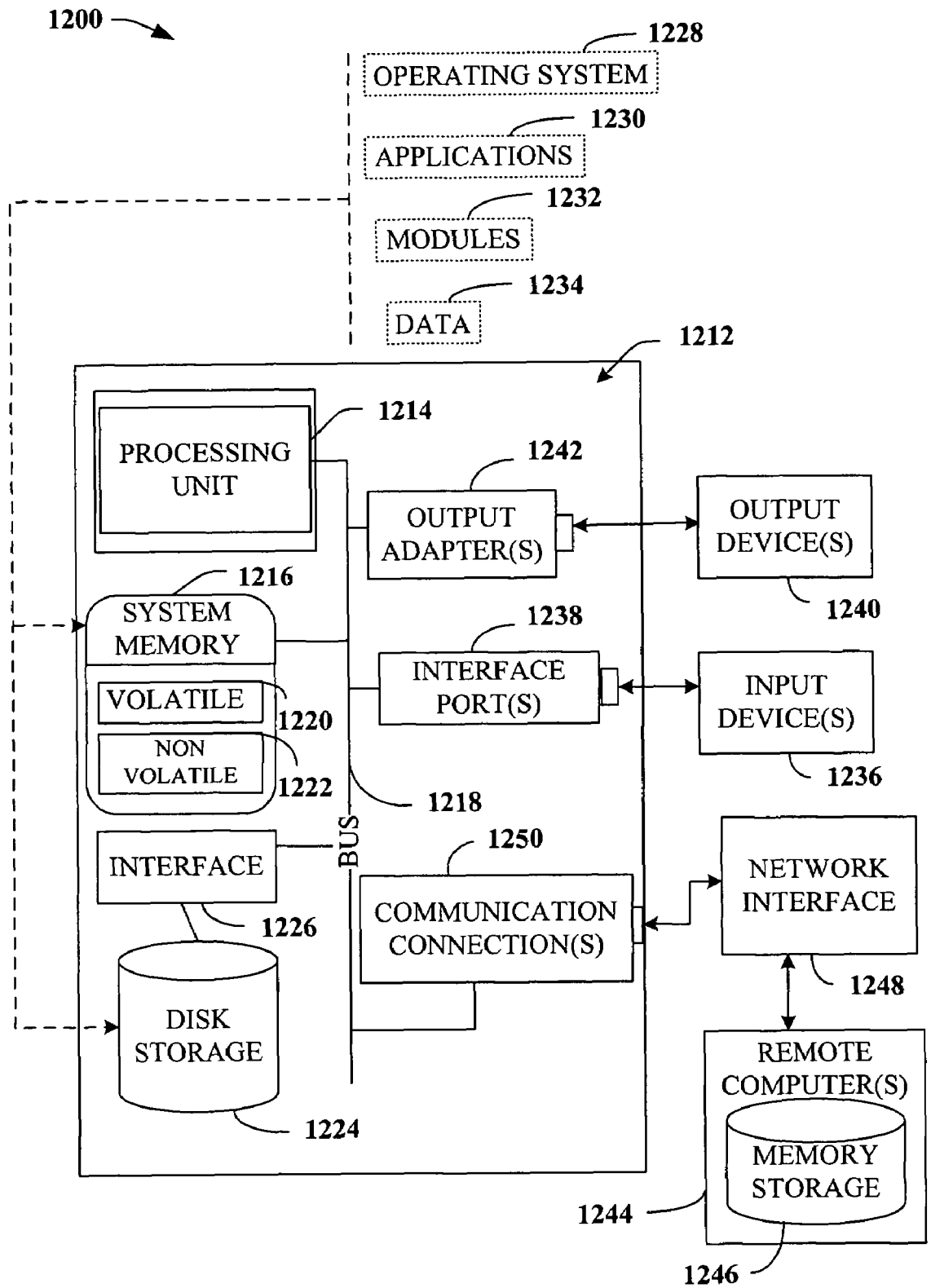
FIG. 12 is a schematic diagram of a sample computing platform.

In order to provide additional context for implementation, FIGS. 11-12 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

FIG. 11 is a schematic block diagram of a sample-computing environment 1100 within which the disclosed and described components and methods can be used. The system 1100 includes one or more client(s) 1110. The client(s) 1110 can be hardware and/or software (for example, threads, processes, computing devices). The system 1100 also includes one or more server(s) 1120. The server(s) 1120 can be hardware and/or software (for example, threads, processes, computing devices). The server(s) 1120 can house threads or processes to perform transformations by employing the disclosed and described components or methods, for example. Specifically, one component that can be implemented on the server 1120 is a security server, such as the security server 240 of FIG. 2. Additionally, various other disclosed and discussed components can be implemented on the server 1120.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the server(s) 1140.

With reference to FIG. 12, an exemplary environment 1200 for implementing various components includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

The various types of volatile and non-volatile memory or storage provided with the computer 1212 can be used to store components of various implementations of the data port signaling system disclosed and described herein. For example, with reference to FIG. 1, the credential module 120 can be implemented as a software module in the non-volatile memory 1222. At runtime, information the credential module 120 can be loaded into the volatile memory 1220 from where machine-interpretable code can be accessed by the processing unit 1214 and thereby placed into execution.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the disclosed components and methods can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. The interface ports 1238 specifically can include various data connection ports that can be used with components disclosed and described herein, among others.

Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for protecting against information security breaches, comprising:
    a client computer including a processor coupled to computer-readable storage media containing instructions executable by the processor for implementing a credential module that maintains a set of security credentials that are each associated with corresponding known computing systems, wherein the credential module detects when security credentials of the set of security credentials are to be used; and
    a protection module implemented by the processor that detects use of security credentials of the set of security credentials in connection with an unverified computing system other than the associated known computing systems, wherein the protection module is configured to report the use of the security credentials with the unverified computing system in a report to a security server,
    wherein the security server determines that the unverified computing system is engaged in malicious activity when a number of reports of the use of the security credentials with the unverified computing system received from the client computer and one or more other client computers exceeds a predetermined threshold.

2. The system of claim 1, wherein a report from the protection module to the security server includes verification information that can be used to determine whether a phishing attack is underway.

3. The system of claim 2, wherein the verification information includes at least one of a userid, a password, a domain name, source code of a viewed web page, timestamp information from a security server, a time of a previous login at a trusted site, and a hash based at least in part upon one of a userid, a password, a domain name, source code of a viewed web page, timestamp information from the security server, and a time of a previous login at a trusted site.

4. The system of claim 1, wherein the protection module requests an indication from the security server that indicates whether the unverified computing system is trusted, or is suspected of malicious activity.

5. The system of claim 1, wherein the security server verifies whether the report originated from a genuine user by accessing verification information from a user identification data store residing on the security server or a trusted site.

6. The system of claim 1 wherein the security server uses data mining tools to identify a pattern derived at least in part from timing and content of the reports.

7. The system of claim 1, wherein the client computer is configured to receive a warning message issued by the security server in response to receiving the report when the security server determines that the unverified computing system is engaged in malicious activity.

8. The system of claim 1, wherein a known computing system corresponding to the used security credentials is configured to receive a user name of the client computer from the security server in response to the security server receiving the report when the security server determines that the unverified computing system is engaged in malicious activity.

9. A method for protecting against attempts to obtain security credentials, comprising:
    employing a processor executing computer-executable instructions stored on a computer-readable storage medium to cause a security server to implement the following acts:
    receiving, at the security sever from a plurality of client computers, domain names of trusted sites that are associated with security credentials for each of the client computers;
    maintaining a set of the domain names of the trusted sites that are associated with security credentials for each of the client computers in a trusted data store accessible by the security server;
    receiving reports at the security server from a plurality of the client computers that indicates that security credentials associated with one or more of the trusted sites are being used by the plurality of client computers at an unverified site that is not one of the trusted sites;
    maintaining a counter that tracks the reports of the security credentials associated with the one or more trusted sites being used at the unverified site, wherein the counter is incremented each time one of the reports is received for the unverified site; and
    flagging the unverified site as engaging in suspected malicious activity when the counter of the number of reports received exceeds a predetermined threshold.

10. The method of claim 9, further comprising sending information about the reported use of the security credentials at the unverified site to the one or more trusted sites associated with the security credentials that were used at the unverified site.

11. The method of claim 10, wherein sending information about the reported use of the security credential to the first trusted site includes sending at least one of userid, a password, a domain name, source code of a viewed web page, timestamp information from the security server, a time of a previous login at a trusted site, and a hash based at least in part upon one of a userid, a password, a domain name, source code of a viewed web page, timestamp information from the security server, and a time of a previous login at the first trusted site.

12. The method of claim 10,
    wherein, in response to receiving the information from the security server, the one or more trusted sites associated with the security credentials that were used at the unverified site implement at least one protective measure to protect accounts associated with the security credentials that were used at the unverified site,
    wherein the protective measures implemented by the one or more trusted sites include at least one of suspending account access, suspending account activity, or notifying the owner of the account.

13. The method of claim 9, wherein the security server is configured to determine that the unverified site is engaged in misappropriation of security credentials based on the counter value.

14. A system for protecting against attempts to obtain security credentials, comprising:
    a security server including a processor coupled to computer-readable storage media containing instructions executable by the processor for:

receiving a report from a client that a security credential associated with a first trusted site is being used at an unverified site;

whether the reported use of the security credential is in conjunction with a malicious site based at least in part on aggregate data obtained from a plurality of reports received from a plurality of clients indicating that the plurality of clients have submitted security credentials associated with trusted sites to the unverified site; and determining, based upon the analyzing, that the reported use of the security credential is in conjunction with a suspected malicious site when a number of the reports received exceeds a predetermined number.

15. The system of claim 14, wherein the security server is configured to send information about the reported use of the security credentials by the plurality of clients at the unverified site to the first trusted site.

16. The system of claim 15, wherein, in response to receiving the information from the security server, the first trusted site implements at least one protective measure to protect accounts associated with the security credentials that were used at the unverified site.

17. The system of claim 14, wherein the clients are configured to detect use of the security credentials in connection with an unverified site and report such use to the security server.

18. The system of claim 17, wherein the clients are further configured to generate a warning message, or prevent the security credentials from being used at the unverified site.

19. The system of claim 14, wherein the security server is configured to communicate the status of the reported use to at least one client by way of at least one of a response to a status request from the at least one client, or via broadcasting the status to a plurality of the clients.

* * * * *